(12) United States Patent
Whittenberger et al.

(10) Patent No.: US 9,643,150 B2
(45) Date of Patent: May 9, 2017

(54) TOOLS FOR INSTALLING REACTOR COMPONENTS

(71) Applicant: Catacel Corp., Garrettsville, OH (US)

(72) Inventors: William A. Whittenberger, Leavittsburg, OH (US); Joseph W. Whittenberger, Ravenna, OH (US); Randall J. Bartos, Ravenna, OH (US)

(73) Assignee: Johnson Matthey Public Limited Company, London (GB)

( * ) Notice: Subject to any disclaimer, the term of this patent is extended or adjusted under 35 U.S.C. 154(b) by 790 days.

(21) Appl. No.: 13/887,469

(22) Filed: May 6, 2013

(65) Prior Publication Data
US 2014/0325843 A1 Nov. 6, 2014

(51) Int. Cl.
*B01J 19/00* (2006.01)
*B01J 19/24* (2006.01)
*B01J 8/02* (2006.01)

(52) U.S. Cl.
CPC ......... *B01J 19/0053* (2013.01); *B01J 8/0285* (2013.01); *B01J 19/2485* (2013.01); *B01J 2208/00203* (2013.01); *B01J 2208/06* (2013.01); *B01J 2219/00018* (2013.01); *B01J 2219/00761* (2013.01); *B01J 2219/2441* (2013.01); *B01J 2219/2492* (2013.01); *B01J 2219/2496* (2013.01); *Y10T 29/4935* (2015.01);
(Continued)

(58) Field of Classification Search
CPC .. B01J 19/0053; B01J 8/0285; B01J 19/2485; B01J 2219/00018; B01J 2208/00203; B01J 2219/2441; B01J 2208/06; B01J 2219/2492; B01J 2219/2496; B01J 2219/00761; B01J 19/325; B01J 19/32; B01J 8/002; B01J 2219/32275; B01J 2219/0002; B01J 2219/00024; B21D 53/02; Y10T 29/53913; Y10T 29/54; Y10T 29/53983; Y10T 29/49352; Y10T 29/53796; Y10T 29/49345; Y10T 29/531; Y10T 29/53987; Y10T 29/49819; Y10T 29/53991; Y10T 29/4935; Y10T 29/53917; Y10T 29/49815
See application file for complete search history.

(56) References Cited

U.S. PATENT DOCUMENTS 3,887,980 A * 6/1975 Yates ...................... B23P 19/04
29/256
3,951,428 A * 4/1976 Sugiura ................. B60R 21/272
137/68.13
(Continued)

*Primary Examiner* — Sarang Afzali
(74) *Attorney, Agent, or Firm* — Pearne & Gordon LLP; Kevin M. Carroll

(57) ABSTRACT

Reactor installation tools and methods for installing reactor components in a reactor tube are described herein. A reactor installation tool can include a releasable attachment assembly for securing the tool to a reactor or support for holding reactor components. The tool can include a movable cylinder that can be actuated to engage and push on a reactor component in an interior region of the reactor for positioning the contents of the reactor in a desired location. The tool can further include means for supply blasts of compressed gas to an interior region of the reactor to aid in the expansion and positioning of the reactor contents. A skirt seal can be used to ensure that the blasts of compressed gas are contained in the interior region of the reactor.

16 Claims, 7 Drawing Sheets

(52) U.S. Cl.
CPC ........ *Y10T 29/49345* (2015.01); *Y10T 29/531* (2015.01); *Y10T 29/53796* (2015.01); *Y10T 29/53991* (2015.01)

(56) References Cited

U.S. PATENT DOCUMENTS

| | | | | |
|---|---|---|---|---|
| 4,452,478 | A | * | 6/1984 | Dulaney ................. B09B 1/008 294/82.32 |
| 4,885,123 | A | * | 12/1989 | Ikeuchi ................ G21C 19/105 294/86.25 |
| 4,886,635 | A | * | 12/1989 | Forster .................. G21C 17/00 294/116 |
| 5,037,603 | A | * | 8/1991 | Wood ..................... G21C 3/334 29/723 |
| 5,331,841 | A | * | 7/1994 | Beaver ................ B01J 19/0053 73/40.7 |
| 5,577,084 | A | * | 11/1996 | Dillmann ............ G21C 15/243 376/260 |
| 7,472,936 | B2 | | 1/2009 | Whittenberger et al. |
| 7,501,102 | B2 | | 3/2009 | Whittenberger et al. |
| 7,565,743 | B2 | | 7/2009 | Whittenberger et al. |
| 8,495,814 | B1 | | 7/2013 | Whittenberger et al. |
| 2012/0195801 | A1 | | 8/2012 | Whittenberger et al. |
| 2013/0259757 | A1 | | 10/2013 | Whittenberger et al. |

* cited by examiner

TOOLS FOR INSTALLING REACTOR COMPONENTS

FIELD OF THE INVENTION

The present invention relates to methods of installing reactor components and the tools used to perform the same, and in particular, to installation tools for installing reactor components such as structured catalysts suitable for use in a reactor tube.

BACKGROUND

Reactor components, such as those used in the field of surface catalytic reactions and heat exchange, can fit within a reactor tube, which can transfer heat from the reactor tube to the interior of the tube or the reactor unit contained therein, or from the interior of the tube or reactor unit to the reactor tube. One example of a reactor unit is a stackable structural reactor, or SSR. Reactor components for carrying out catalytic reactions, such as those used to produce syngas and hydrogen, can generally contact reactor tubes exposed to a heat source, for example a furnace, to support reactions. In contrast, other types of reactions, such as exothermic reactions, can require a cooling source, such as a cooling jacket. The reactor tubes can be loaded with various arrangements of components, such as foil-supported or structured catalysts in the form of fans, fins, foams, coils or monoliths. In some instances, the reactor components can be expandable, such as those formed from foil, for example, a fan.

To improve heat transfer and fluid flow through a reactor, the fit of foil-supported catalysts can be enhanced. In a reactor tube, expandable catalyst-coated reactor components can be positioned to increase heat transfer, such as being located near the reactor wall exposed to a heating or cooling source. Thus, it is desirable to install and fit reactors with accessories to promote increased heat transfer and reactor efficiency, such as features that create turbulent and/or impingement fluid flow through the reactor components. The reactor installation tools described herein can be used with any style of reactor, such as a cylindrical-shaped tube reactor. Reactor components can occupy substantially all of the space within a reactor tube and/or press firmly against the interior wall of the reactor tube. Installation of reactor components can cause damage, such as denting portions of the reactor tube or other components, for example, the fins of a reactor. Other damage can be caused, for example, scratching or bending the reactors, which can negatively affect performance, such as the heat transfer or reaction rate. Thus, there is a need to install reactor components in a reactor tube with a tool that avoids damaging the reactor components or tube. The present invention focuses on the use of such installation tools.

BRIEF SUMMARY

A reactor installation tool including a releasable attachment assembly for securing the tool to a support, such as a center post, positioned in the reactor. The tool can further include a gas supply outlet, such as one or more open air tubes, being open to an interior region of the reactor. The gas supply outlet can provide blasts of compressed gas to the interior of the reactor for expanding or pushing on reactor components wherein the reactor components are preferably expandable in the radial direction. The tool can further include a seal, such as a skirt seal, for engaging an interior region of the reactor. The seal is designed to ensure the blast of compressed gas is substantially contained in the interior of the reactor. As such, the seal engages the interior region of the reactor to prevent or reduce the compressed gas from escaping out of the reactor. The tool can further include a movable cylinder, such as a tube having an open section portion for receiving the support and for pushing on one or more reactor components, such as an expansion weight, positioned in an interior region of the reactor. The movable cylinder can move up and down and be actuated by compressed gas or one or more slidable push weights located in the tool.

A reactor installation tool including a releasable attachment assembly for securing the tool to a reactor or a reactor component or support. The releasable attachment assembly can have at least two gripping jaws for securing the tool. The tool can further include a means, such as a valve, for releasing compressed gas into an interior of the reactor, for instance, for expanding or positioning reactor components. The tool can further include a movable cylinder for pushing on a reactor component positioned in an interior region of the reactor. The movable cylinder can be actuated up and down for engaging the reactor component. Actuation of the movable cylinder can be accomplished by using compressed gas, such as with a pneumatic cylinder, or slidable push weights located in the tool.

A method of installing a reactor component in a reactor tube. The method can include the steps of providing a reactor installation tool. The reactor installation tool can include a releasable attachment assembly for securing the tool to a support holding a reactor component. The tool can further include a means for releasing compressed gas into an interior region of the reactor and a movable cylinder for pushing on a reactor component positioned in an interior region of the reactor. The movable cylinder can be actuated up and down for engaging the reactor component. Actuation of the movable cylinder can be accomplished by using compressed gas, such as with a pneumatic cylinder, or slidable push weights located in the tool. The method also can include attaching the tool to the support with the releasable attachment assembly and thereafter releasing pressurized gas into an interior region of the reactor and actuating the movable cylinder to engage and push on the reactor component, such an expansion weight. To remove the tool from the reactor, the releasable attachment assembly can be retracted or released to detach the tool form the support.

BRIEF DESCRIPTION OF THE DRAWINGS

The following figures illustrate various aspects of one or more embodiments of the present invention, but are not intended to limit the present invention to the embodiments shown.

DETAILED DESCRIPTION

As used herein, when a range such as 5-25 is given, this means at least or more than 5 and, separately and independently less than or not more than 25. Materials of construction for the reactor installation tools or parts thereof, as well as the reactor and reactor components, as discussed herein, can include any suitable material as known in the art, for example, metal, non-ferrous metal, metal foil, steel, stainless steel, alloys, foils, non-metals such as plastics or glass, ceramic, or combinations thereof.

The reactors as described herein, sometimes referred to as a stackable structural reactors ("SSRs"), can include a reactor tube housing multiple catalyst support components arranged around or stacked on a support, such center support or center post, such as a central rod or mandrel, pipe, post or the like, in order to form a monolith of general annular cross section as viewed in the direction of flow of fluid through the reactor. The catalyst support components can include fans, fins, honeycombs, foams or coils. The monolith or stacked catalyst supports can occupy all or a portion of the annular space between two concentrically arranged tubes, such as a reactor or outer tube and an inner tube. Alternatively, reactor components can fill a reactor tube with or without a center support such that no center hollow section is formed concentric tubes.

The catalyst support components can be expandable in the radial direction and can be forced into position during installation with the reactor installation tool. Such positioning of the reactor components, such as fans, in specific locations in the reactor tube is desirable to achieve the maximum heat transfer and reactor efficiency. As described herein, various modifications and embodiments of installing and positioning reactor components can be used in connection with the reactor installation tools to promote heat transfer and reactor efficiency. For instance, the reactor installation tool can be used to move and position reactor components to achieve increased reactor efficiency and heat transfer.

Figure 1:
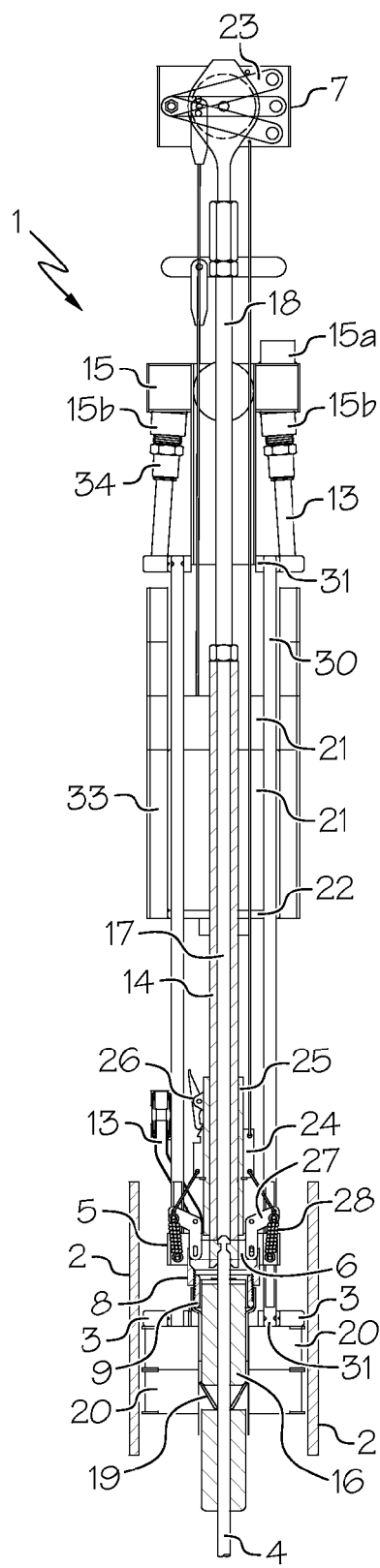
FIG. 1 shows a cross-section view of a reactor installation tool for use in installing reactor components. The tool is shown with the moveable cylinder in a pre-extended position.
Figure 3:
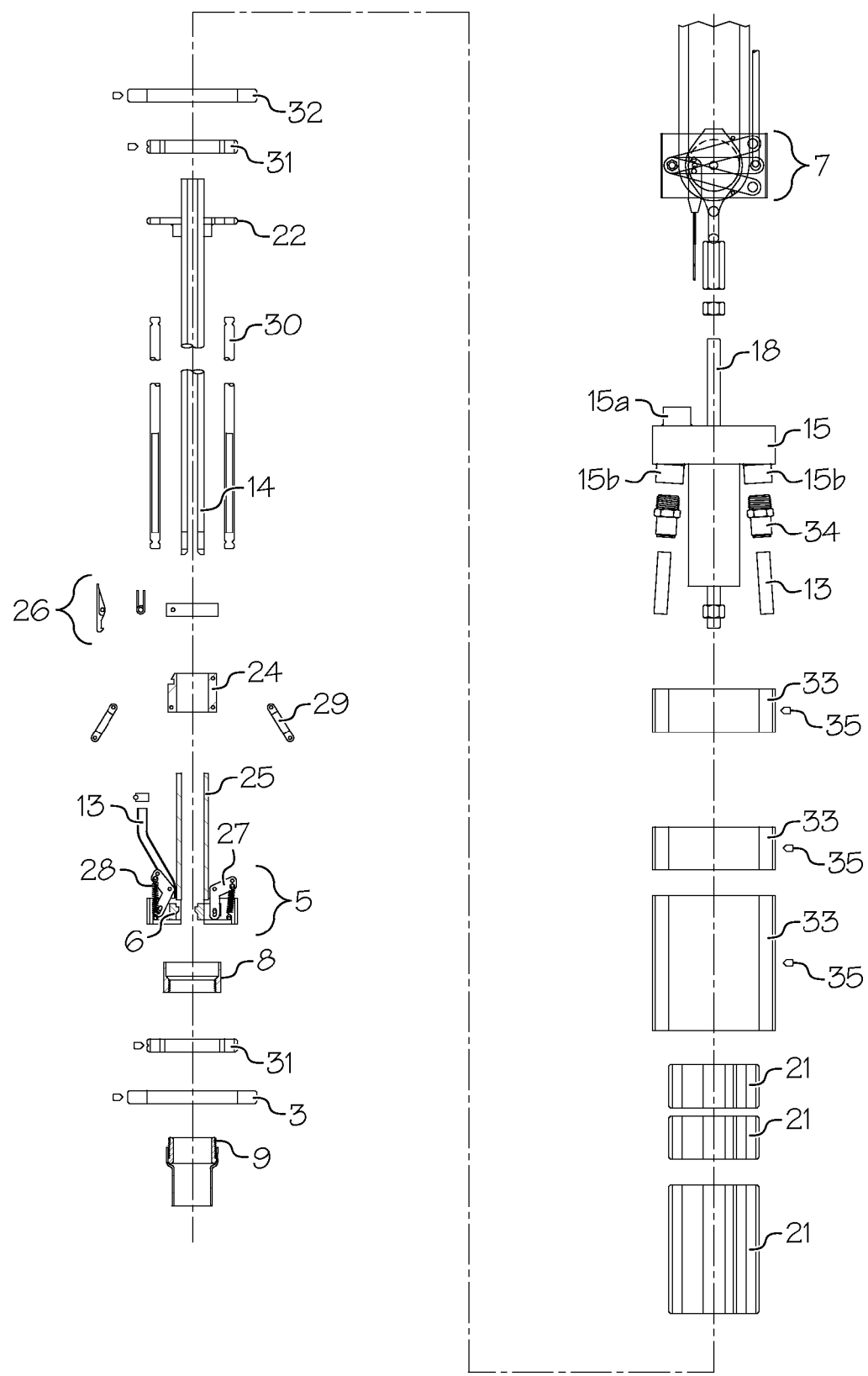
FIG. 3 shows an exploded cross-section view of the reactor installation tool shown in FIG. 1 and FIG. 2.

Turning to the figures, FIG. 1 shows a reactor installation tool 1. In another view, the components of the reactor installation tool 1 are shown in an exploded view in FIG. 3. The components are arranged from top to bottom.

As shown, the tool 1 includes an end for contacting the reactor or components therein, such as a tubular reactor having a tube 2 opening for exposing the interior region of the reactor and reactor components contained therein. The tool 1 can have dimensions and a diameter less than the reactor tube 2 opening such that the tool can be inserted into the reactor tube 2. The tool 1 can include a spacer ring 3 located at the end of the tool for insertion into the tube 2 wherein the outer diameter of the spacer ring 3 is preferably slightly less than the inner diameter of the reactor tube. The spacer ring 3 aids in guiding the tool in the reactor tube and is preferably made of plastic or other non-metal material to avoid damaging the interior region of the reactor or components located therein. Spatially located above the spacer ring 3 are the remaining components of the reactor installation tool 1.

Guide posts 30 can be generally used in the tool 1 to provide structural integrity and rigidity for use of the tool in the field. As shown, guide posts can run along the length of the tool to connect and stabilize components, for instance, to connect the upper manifold 15 that supplies compressed gas to the tool 1 to the attachment assembly 5 that secures the tool to the reactor. The guide posts, having a first end and a second end, can be connected together at each end by the use of guide post rings 31 having through holes for receiving the first or second ends of the guide posts. FIG. 1 shows two guide post rings 31 located inside the bottom spacer ring 3 and inside the top spacer ring 32 positioned above the push weights 21.

For securing the tool to a reactor or support 4, the reactor installation tool 1 can include a releasable attachment assembly 5 near its end. The releasable attachment assembly 5 can include two or more gripping jaws 6 for securing the tool 1 to a reactor or support 4, such as a support for holding reactor components. The gripping jaws have a face for engaging and contacting the support, which can be located in an interior region of the reactor or outside of the reactor. For instance, the attachment assembly 5 can secure the tool to a reactor stack composed of at least a support holding one or more reactor components stacked on the support. The tool can be lowered into a reactor tube 2 along with the reactor sleeve for installing and positioning the reactor components in the reactor tube. Alternatively, the reactor sleeve can be positioned in the reactor tube and the tool can be lowered into the reactor for a blind attachment to the support 4.

Figure 9:
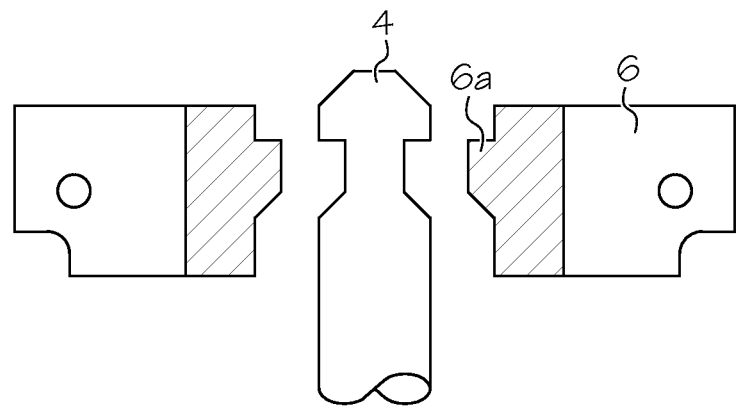
FIG. 9 shows gripping jaws of an attachment assembly for securing a reactor installation tool to a central support.
Figure 10:
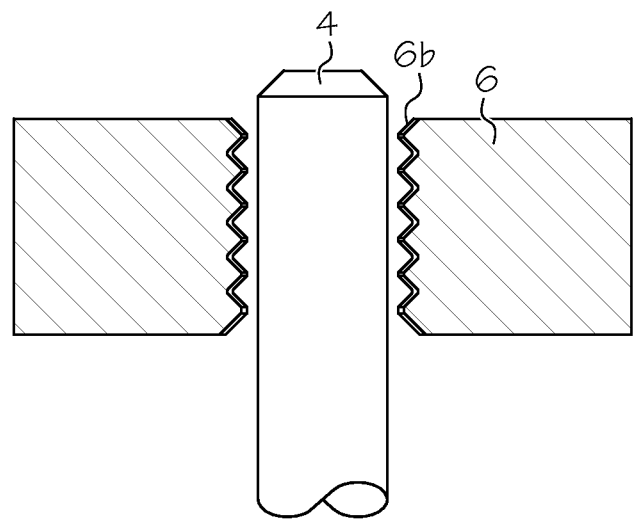
FIG. 10 shows gripping jaws of an attachment assembly for securing a reactor installation tool to a central support.

The face of the jaws 6 can have various topographies for gripping the support 4, such as flat, rippled, notched, series of triangular teeth or one or more protuberances for accommodating indentations in a support. For example, as shown in FIG. 9, the support 4 can have a notched end or collar at one end and the face of the gripping jaws 6 can have a bump or raised section 6a that fits in the notched end or portion thereof and/or an indented or concave face section for accommodating a collar such that the collar on the support nests in the indented section. FIG. 10 shows a support 4 having a smooth flat outer diameter surface along its length. The face 6b of the gripping jaws 6 can have a series of teeth for gripping the support. The gripping jaws 6 can be actuated back and forth, such as horizontally, for gripping and releasing the support. The attachment assembly 5 can be actuated with the use of compressed gas or mechanically moving the jaws, such as by hand force. For instance, as described below, the attachment assembly can be connected by a wire to a trip mechanism 7 for releasing the spring-loaded gripping jaws with the use of push weights. In another embodiment, the releasable attachment assembly can include a ball-lock device (not shown) such as a shaft collar, for example those manufactured by QuikLoc. A ball-lock device can be useful for securing the tool 1 to a support 4 that has an end with a collar or nob wherein the ball-lock device can slide over the collar to lock the tool to the support and then subsequently be released to remove or detach the tool from the support, for example, by lifting up on the device.

The tool 1 can further include a seal housing 8 for securing a seal 9 near an end of the tool, for example, below and in contact with to the releasable attachment assembly 5.

Figure 8:
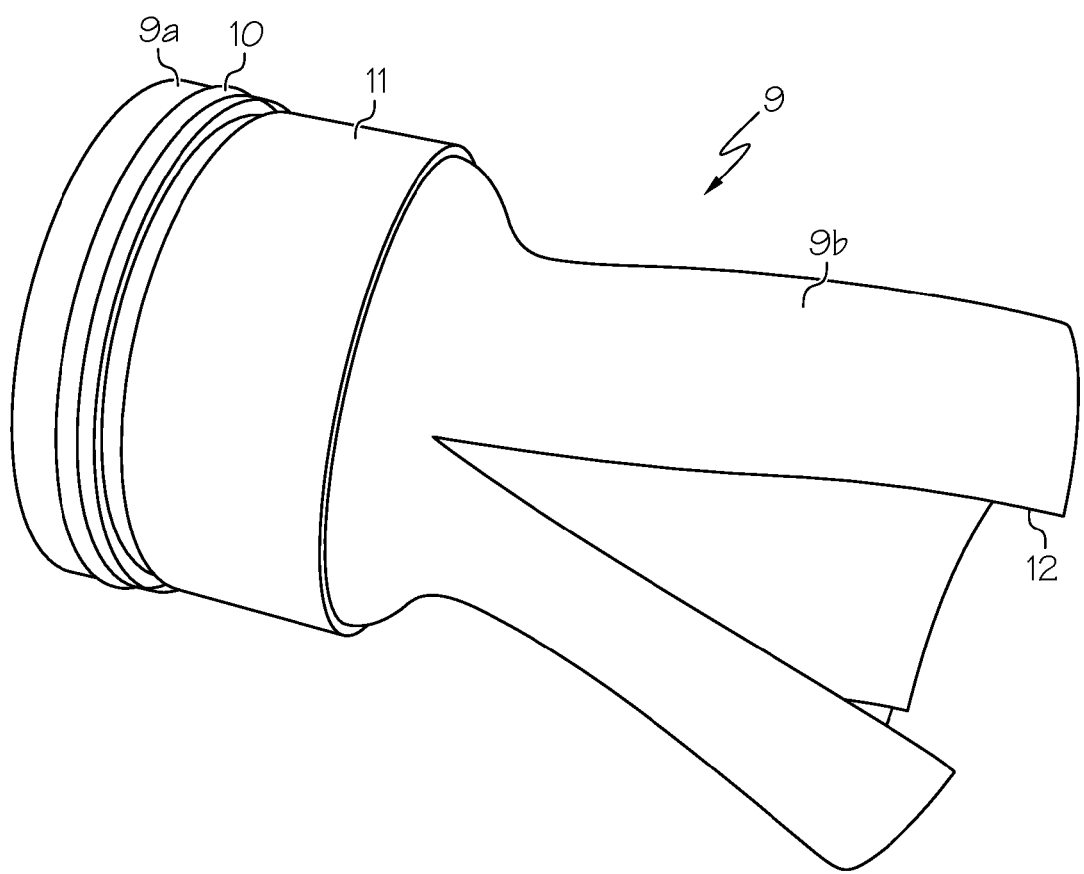
FIG. 8 shows a seal for use in installing reactor components.

The seal housing 8 can have an opening, preferably circular, for accommodating a seal 9, such as a threaded opening or clamp opening for securing the seal to the seal housing and tool. The seal, as shown in FIG. 8, has a first end 9a and a second end 9b, wherein the first end can be releasably secured to the tool by the seal housing. The first end of the seal can be a ring, preferably made of metal, having an inner diameter surface and an outer diameter surface. The ring can have dimensions to tightly fit into the opening in the seal housing. The ring can have a groove along is outer diameter surface that fits a rubber O-ring 10 for creating an air-tight seal between the ring and seal housing. The ring can further include grooves or notches for accommodating a clamp in the seal housing. In another embodiment, the ring can be threaded and screwed into the seal housing for securing the seal to the tool. In yet another embodiment, the ring of the first end 9a of the seal can be secured to the housing by using a clip arrangement.

The second end 9b of the seal can be flexible for engaging an interior region of the reactor. Preferably, the second end of the seal flexes to cover an open interior region of the reactor such that the open interior region is exposed to the compressed gas outlet of the reactor installation tool and not to the atmosphere outside the reactor. Less preferably, the second end 9b can simply press against the reactor face, creating a seal to the surface. By covering the open interior region of the reactor, the seal provides an isolated interior region that can be filled with compressed gas for purposes of positioning and expanding reactor components or the like. The interior region can be blocked at the opposite end of the reactor tube such that the seal closes the interior region. Thus, the compressed gas passed into the interior region from the tool is trapped or contained in the region due to the seal blocking or reducing the ability of the compressed gas from escaping into the atmosphere outside the reactor.

The flexible second end 9b of the seal 9 can be a tube. The tube can be secured to the first end by slipping an end of the tube over a portion of the ring of the first end. To secure the two ends together, the section of the tube overlaying the portion of the ring of the first end can be glued onto or adhered to the ring or an outer band 11 can be positioned around the tube and ring portion. The band 11 is preferably made from rubber or an elastic material such that the band can press against the tube of the second end and ring portion of the first end for purposes of ensuring the tube does not detach or slip off of the ring. In another embodiment, one or more tubes can be used to form the second end. The multiple tubes can overlay one another and be slid over a portion of the ring of the first end.

The one or more flexible tubes used for the second end of the seal can have a frayed end. For example, a skirt seal made up of two or more frayed tubes can be used as the second end. The tubes can be cut 12 at multiple locations at one end so the end can fan out to provide a flat circular ring that extends outward from the ring of the first end. Two or more tubes having frayed ends can be used so the flat circular ring does not contain open holes or slots that permit compressed gas to escape from the interior region of the reactor. Depending on the nature and capacity of the compressed gas being discharged into the interior region, the seal need not be perfect and some gas can escape. The cuts can be equally spaced around the diameter of one end of the tube and any number of cuts can be made as desired. The cuts can extend upward at any distance, for example, the cuts 12 can extend along the tube to the first end of the seal, such as the section of the tube that overlays the ring of the first end. The flexible nature of the second end and the ability of the flexible end to expand into the cavity in the reactor ensures the interior region is sealed even during movement of reactor components, such as radial expansion.

In another embodiment, the seal can be detached from the tool. For example, the seal can be a round disk having a center aperture. The disk can be positioned on top of the reactor components located within the reactor tube such that the interior region of the reactor is sealed off from the area outside the open end of the reactor. The outer diameter of the disk is in contact with the inner diameter surface of the reactor tube to provide a continuous seal so that compressed gas discharged from the tool does not escape from the interior region of the reactor. The center aperture in the disk can be sized to receive the moveable cylinder and compressed gas discharge provided by the gas supply outlet described below. The disk can be made of any suitable material, such as plastic, rubber, leather and the like.

The tool 1 can further include a gas supply outlet for discharging compressed gas into an interior region of the reactor. The gas supply outlet can be positioned to discharge the compressed gas through the opening in the seal 9 exposed to the interior region of the reactor. The gas supply outlet can include one or more air tubes 13 for directing the discharged gas into the reactor. For example, multiple air tubes 13 can be positioned such that the tube ends are open to the reactor. The air tubes can be equipped with a valve for releasing compressed gas and shutting it off. The air tube ends can be secured in the tool by the attachment assembly 5 such that the air tube ends are arranged radially away from the movable cylinder 14 described below. The air tube ends can be positioned to discharge compressed gas from the attachment assembly and through the seal 9 as shown in FIG. 1. The gas supply outlet can be fed compressed gas through an upper manifold 15. The upper manifold 15 can have an inlet 15a and one or more outlet openings 15b for supplying compressed gas to the one or more air tubes 13. The air tubes can be connected to the outlet openings 15b of the upper manifold 15 by tube fittings 34.

The tool 1 can further include a moveable cylinder 14 for pushing on a reactor component positioned in an interior region of a reactor. The moveable cylinder 14 can slide in the tool and extend outward from the tool through the seal 9 and spacer ring 3 for contacting a reactor component, such as an expansion weight 16. The moveable cylinder can have an opening at one end and an open center section 17 that traverses along the length of the cylinder. The moveable cylinder can have an opening at its other end for receiving a guide rod 18 located in the tool. The guide rod 18 connects the trip assembly 7 to moveable cylinder 14 and passes through an opening in the upper manifold 15. The guide rod 18 stabilizes the moveable cylinder 14 as it moves in and out towards the open region of the reactor.

The end opening and open center section of the moveable cylinder 14 can accommodate a support, for example, a center post used to stack reactor components. The moveable cylinder can slide along the length of the center post 4 into the interior region of the reactor to contact a reactor component and push on a component to facilitate positioning of the component and/or cause movement or expansion of one or more reactor components. For example, the moveable cylinder 14 can push against an expansion weight 16 in a reactor to expand cones 19 that force one or more fans 20 to expand radially outward towards the inner wall of a reactor tube 2.

The moveable cylinder 14 can be actuated to slide up and down by compressed gas or gravity, such as with one or more push weights 21. For use of one or more push weights 21, the moveable cylinder can have a weight support 22 positioned along its length for holding push weights that can be used to actuate the moveable cylinder. The weight support 22 can be a plate that extends radially outward from the moveable cylinder such that push weights 21 can be stacked on the weight support. The weight support can be secured to the moveable cylinder 14 by any means such as welding or attaching a nut on the moveable cylinder for the weight support to sit on. The push weights 21 can have one or more through holes that traverse the entire length of the weight to allow cables, wires or posts to pass through the weights. For instance, the guide posts 30 can pass through the push weights. The through holes can be sized as desired. The push weights 21 can further have weight sleeves 33 surrounding them to provide protection. The weight sleeves 33 can be cylinders having an open section for accommodating one or more push weights. The weight sleeves 33 can be attached to the push weights by conventional means, such as the use of a set screw 35.

The weight support can be secured to a trip assembly 7, for example with a wire, for releasing the weight support and push weights for forcing the moveable cylinder along the guide rod 18 and along the length of the reactor support 4 to push on a reactor component. The trip assembly 7 can be triggered by moving a lever 23 that releases the weight support 22 and push weights 21 wherein gravity allows them to fall and move the moveable cylinder downward to contact the support and push weight 21. FIG. 1 shows the push weights 21 in the non-released position wherein the push weights and weight support 22 are not providing force on the moveable cylinder to cause the cylinder to extend into the interior region of the reactor to push on the expansion weight 16.

The trip assembly 7 can also be attached by a wire to a bushing 24 that is connected to the attachment assembly 5. The bushing 24, located above the attachment assembly, is a cylinder having a central opening for accommodating the moveable cylinder 14 and guide tube 25. The bushing 24 can be in direct contact with the guide tube 25 that surrounds a portion of the moveable cylinder 14. At its top end, the bushing 24 can have a notch or groove for locking the bushing in place with a tension clip 26 located above the bushing and attached to the guide tube. The bushing can slide upward along the length of the guide tube 25 but not past the tension clip 26 that locks the bushing in place. As the bushing moves upward and away from the attachment assembly, the gripping jaws 6 are expanded outward away from the support 4 and the attachment assembly becomes detached from the support. To release the jaws from the support, the wire that connects the trip assembly to the bushing can be pulled upward. When the bushing is pulled all the way up, it engages the tension clip 26 and remains in that position until later released, such as by manually releasing the tension clip to lower the bushing. Thus, in the upward most locked position, the gripping jaws are locked open. To close the jaws again, the spring-loaded tension clip can be manually released, permitting the spring-loaded lever 27 to push the jaws inward to re-grip the support.

As noted above, the attachment assembly 5 can have spring-loaded levers 27 connected to the gripping jaws 6. The levers 27 can have through holes for connecting the levers to pins in the gripping jaws or wires or springs 28. For instance, a through hole in the lever can align with a pin protruding from a surface of a gripping jaw as shown. A spring can also be attached to a through hole in the lever and a pin protruding form a surface of a gripping jaw. The levers can further be connected to a bushing 24 positioned around the moveable cylinder located above the attachment assembly. A wire or connecting link 29 can be secured to a through hole in the lever and extend to the bushing 24 that can have a hole or notch for receiving the wire. Pins can be used to secure the connecting link 29. The bushing can slide along the length of the moveable cylinder. By triggering the trip assembly 7, the wire pulls upward on the bushing 24 that in turn pulls on the lever 27 to which it is attached. The lever 27 moves to release the gripping jaw 6 from the support 4 by forcing the gripping jaw to slide outward away from the support and towards the reactor tube 2.

The gripping jaws 6 can extend through slots in the moveable cylinder when gripping the support. The slots in the moveable cylinder can be open portions in the wall of the cylinder. As the jaws extend through the slots to contact the support, the moveable cylinder rests on the jaws such that it is does not slide downward to contact a reactor component. As the jaws are released and retracted from the slots, the moveable cylinder is free to slide downward to push on the expansion weight. The weight support and push weights add to the force in which the moveable cylinder pushes on the reactor components to ensure desired positioning of the components in the reactor tube.

Figure 2:
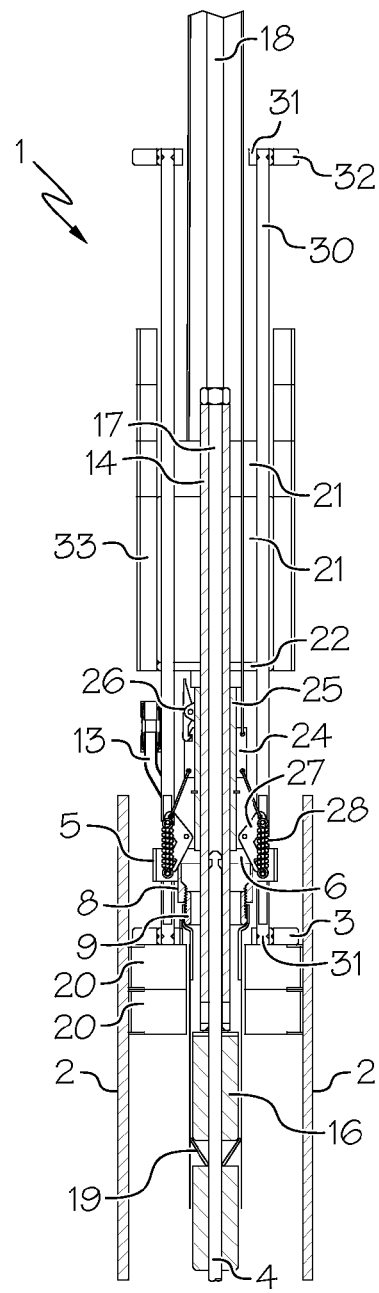
FIG. 2 shows a cross-section view of the reactor installation tool of FIG. 1. The tool is shown with the moveable cylinder in an extended position.

As described, the trip assembly allows the push weights and attachment assembly to work in relation to one another. The push weights 21 can be released from the retracted position as shown in order to slide the moveable cylinder to engage a reactor component as the bushing connected to the gripping jaws is lifted to detach the attachment assembly from the support. FIG. 2 shows the push weights and moveable cylinder in the released position wherein the moveable cylinder is contacting and pushing downward on an expansion weight 16 to radially expand reactor components, such as fans 20 and cones 19. FIG. 2 further shows the gripping jaws 6 of the attachment assembly 5 separated from the support to detach the tool from the reactor.

Figure 4:
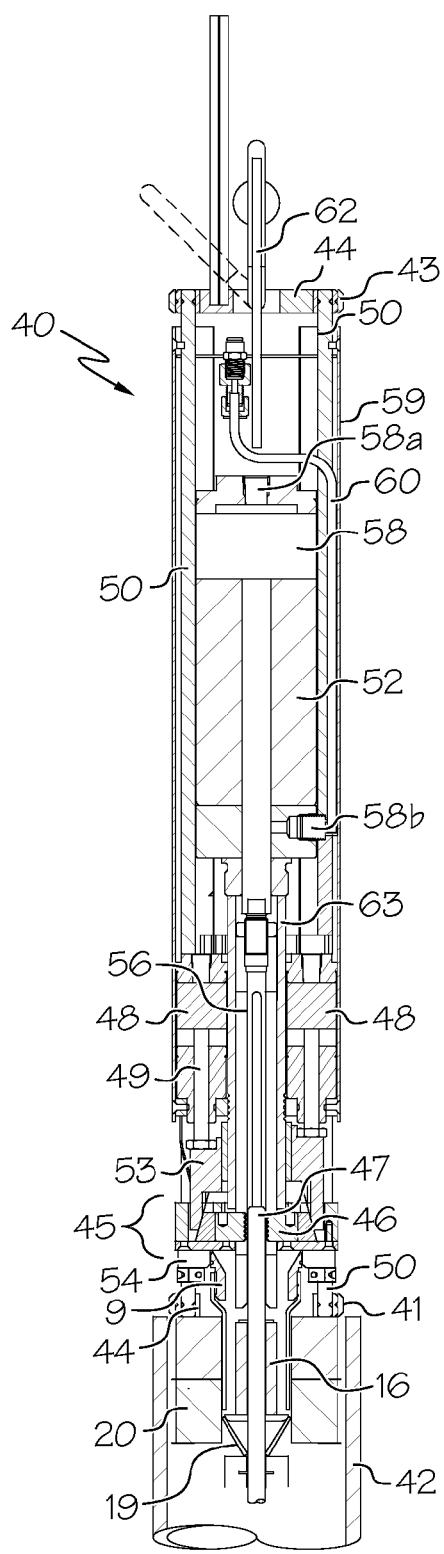
FIG. 4 shows a cross-section view of a reactor installation tool for use in installing reactor components. The tool is shown with the moveable cylinder in a pre-extended position.
Figure 5:
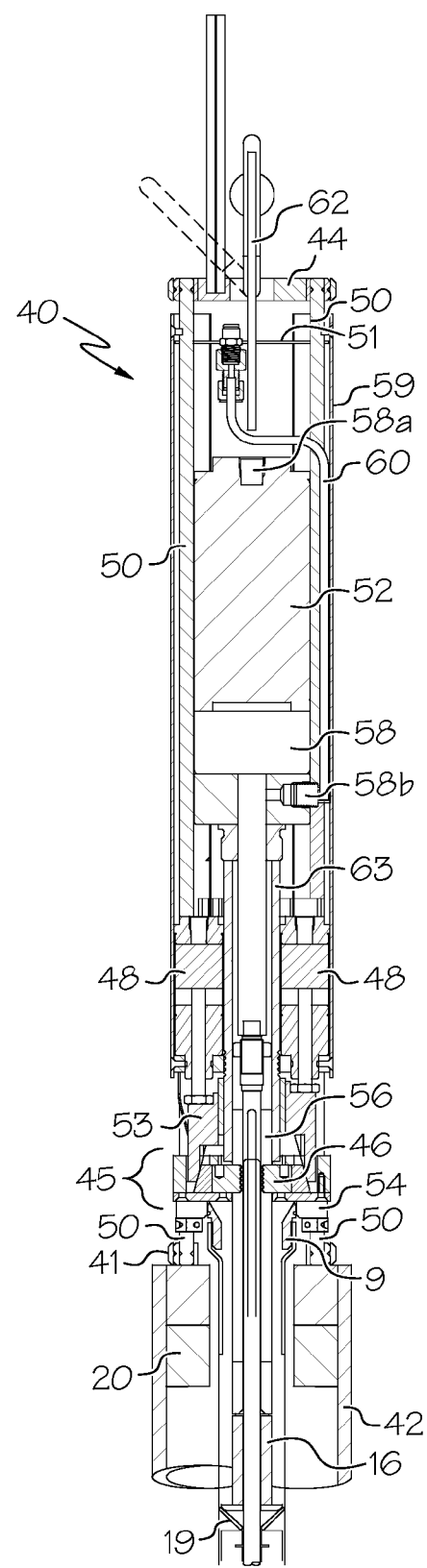
FIG. 5 shows a cross-section view of the reactor installation tool of FIG. 4. The tool is shown with the moveable cylinder in an extended position.

FIG. 4 shows another embodiment of a reactor installation tool 40. The tool 40 has dimensions and a diameter less than the reactor tube 42 opening such that the tool can be inserted into the reactor tube 42. The bottom end of the tool 40 can be equipped with a spacer ring 41 for contacting reactor components positioned inside a reactor tube 42. The outer diameter of the spacer ring 41 is preferably slightly less than the inner diameter of the reactor tube. The spacer ring 41 aids in guiding the tool in the reactor tube and is preferably made of plastic or other non-metal material to avoid damaging the interior region of the reactor or components located therein.

Guide posts 50 can be generally used in the tool 40 to provide structural integrity and rigidity for use in the field. As shown, guide posts can run along the length of the tool to connect and stabilize components, for instance, to connect the top spacer ring 43 to the attachment assembly 45 that secures the tool to the reactor. The guide posts, having a first end and a second end, can be connected together at each end by the use of guide post rings 44 having through holes for receiving the first or second ends of the guide posts. FIG. 4 shows two guide post rings 44 located inside the bottom spacer ring 41 and inside the top spacer ring 43 positioned above the pneumatic cylinder 52.

To protect the components of the tool 40 during use, one or more panels 59 can be attached. The panels 59 shield the components of the tool from coming in contact with foreign objects and dust. The panels can be attached to the tool with screws or the like and can be secured to any feature, for example, the guide tube as shown.

For securing the tool 40 to a reactor or support 47, the reactor installation tool 40 can include a releasable attachment assembly 45 near its end. The releasable attachment assembly 45 can include two or more gripping jaws 46 for securing the tool 40 to a reactor or support 47, such as a support for holding reactor components. The gripping jaws can have faces for engaging and contacting the support as described above. The gripping jaws 46 can be actuated back and forth, such as horizontally, for gripping and releasing the support 47. The attachment assembly 45 can be actuated with the use of compressed gas. For instance, the attachment assembly can be connected to jaw cylinders 48 that use compressed gas for contracting and releasing the gripping jaws.

Figure 6:
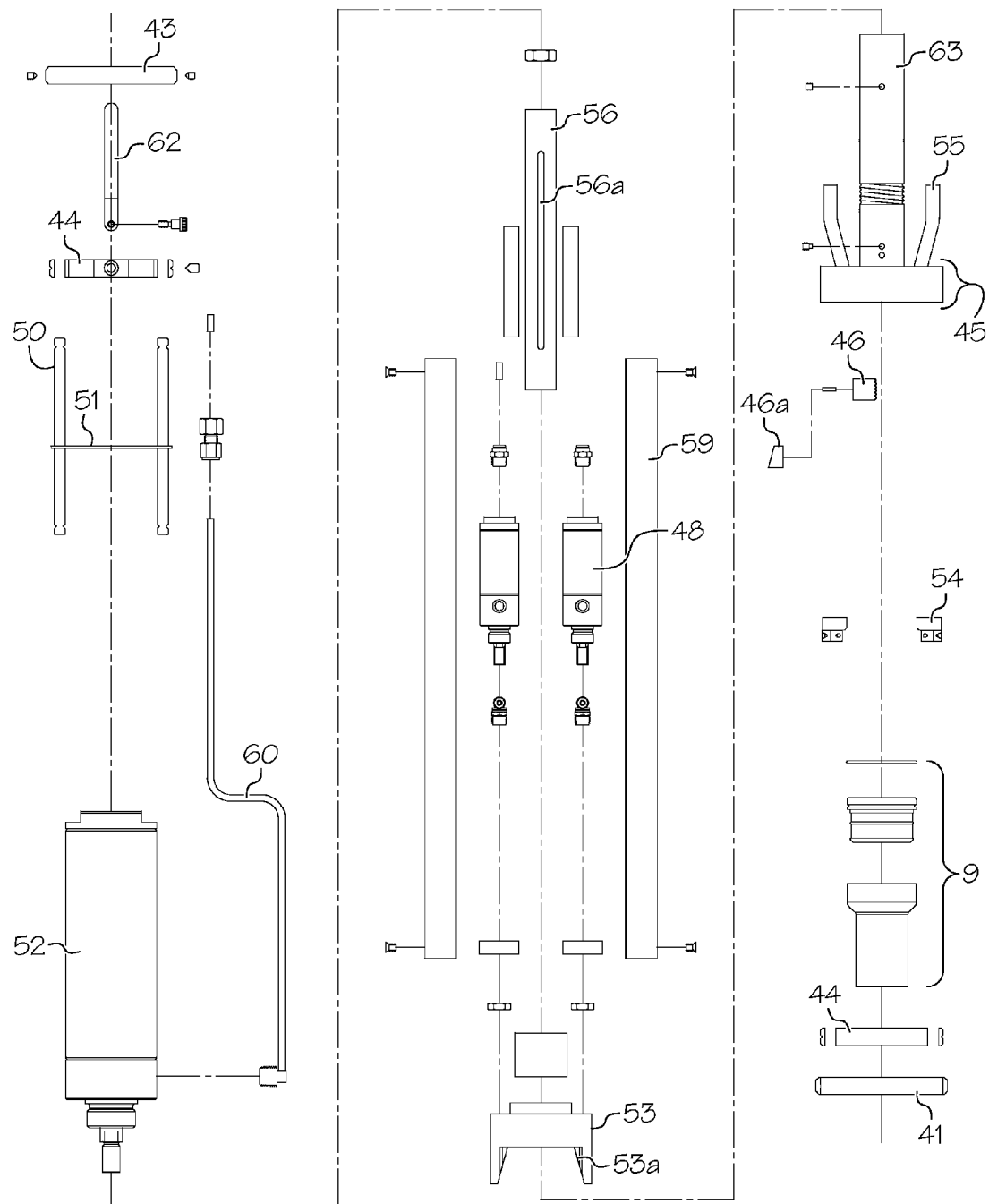
FIG. 6 shows an exploded cross-section view of the reactor installation tool shown in FIG. 4 and FIG. 5.

The jaw cylinders 48 can have a push rod 49 for engaging a slide block 53 to move it up and down for actuating the gripping jaws 46. Any number of jaw cylinders can be used to engage the slide block for actuating the gripping jaws. For instance, at least 2, 3, 4, 5, or 6 jaw cylinders can be arranged in the tool. As the push rod 49 extends outward out of the jaw cylinder 48, the slide block is pushed downward to push the gripping jaw inward to grip the support. To retract the gripping jaw, the jaw cylinder can move the push rod upward to release the slide block and permit it to move away from the support to retract the jaws. The slide block 53 can be a cylinder having an opening traversing its entire length wherein the block has an outer diameter surface and an inner diameter surface. The inner diameter surface of the block can have a portion that tapers outward towards the outer diameter surface to create a frustoconical section 53a. The tapered inner diameter surface of the block 53 can contact the gripping jaw having a diagonal face 46 as shown in FIGS. 4 and 6. The frustoconical section of the block slides along the diagonal face of the gripping jaw to push the jaw inward and outward depending on the movement of the push rod.

The tool 40 can further include a seal housing 54 for securing a seal 9 near an end of the tool 40, for example, adjacent to the releasable attachment assembly 45. The seal housing 54 can have an opening, preferably circular, for accommodating a seal 9, such as a threaded opening or clamp opening for securing the seal to the seal housing and tool. The seal 9 is described above with regard to FIG. 1 and as shown in FIG. 8.

The tool 40 can further include a means for discharging compressed gas into an interior region of the reactor, such as a gas supply outlet. The gas supply outlet can be positioned to discharge the compressed gas through the opening in the seal 9 exposed to the interior region of the reactor. As shown in FIG. 6, the gas supply outlet can include one or more air tubes 55 for directing the discharged gas into the reactor. For example, multiple air tubes 55, such as three, can be positioned such that the tube ends are open to the reactor. The air tubes can be equipped with a valve for releasing compressed gas and shutting it off. The air tube ends can be secured in the tool by the attachment assembly 45 such that the air tube ends are arranged radially away from the movable cylinder 56 but inside the seal opening. The air tube ends can be positioned to discharge compressed gas from the attachment assembly and through the seal 9 as shown in FIG. 6.

Figure 7:
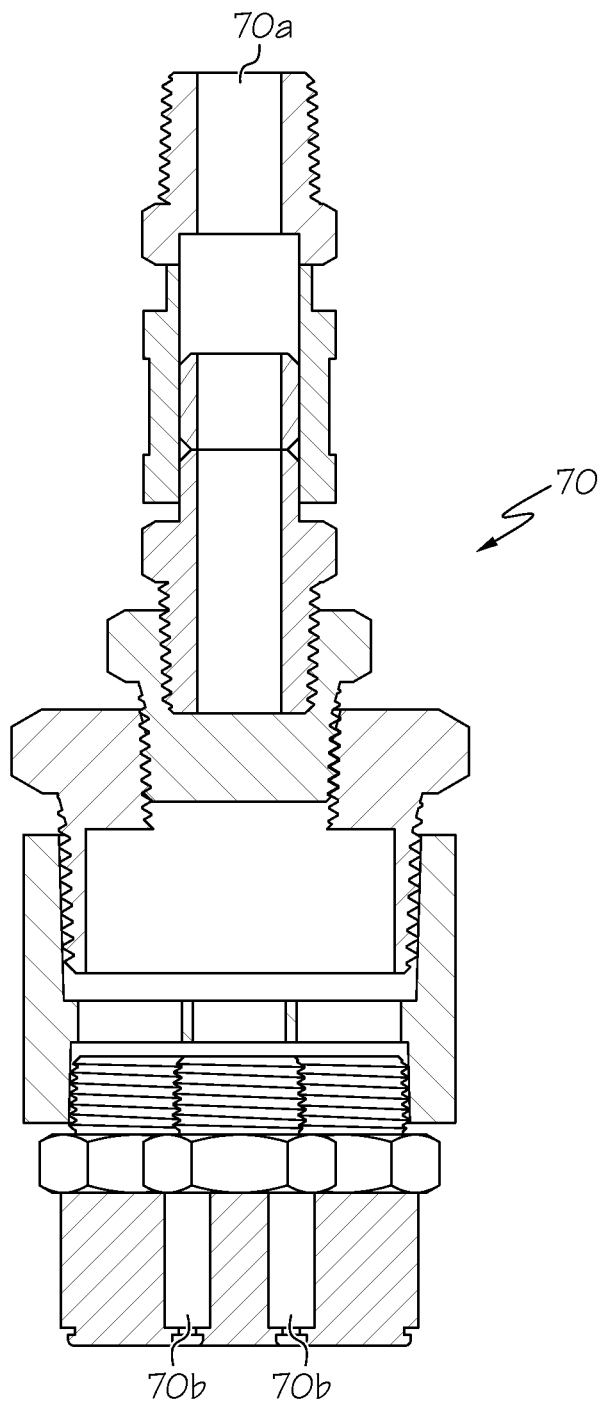
FIG. 7 shows a cross-section view an air supply manifold for use with the reactor installation tool of FIG. 4 and FIG. 5.

The gas supply outlet can be fed compressed gas through an upper manifold 70. The upper manifold is shown in FIG. 7. The upper manifold 70 can have an inlet 70a and one or more outlet openings 70b for supplying compressed gas to the one or more air tubes 55. The air tubes can be connected to the outlet openings 70b of the upper manifold 70 by tube fittings and hoses as known in the art. Hoses can run from the manifold and through the tool to tubes 55 connected to the releasable attachment assembly 45 to provide compressed gas to the outlet. As described below, the upper manifold 70 can further supply compressed gas to the jaw cylinders for actuating the gripping jaws and to the pneumatic cylinder for actuating the moveable cylinder for engaging and pushing on reactor components.

The tool 40 can further include a moveable cylinder 56 for pushing on a reactor component positioned in an interior region of a reactor. The moveable cylinder 56 can slide in the tool and extend outward from the tool through the seal 9 and spacer ring 41 for contacting a reactor component, such as an expansion weight 16. The moveable cylinder can have an opening at one end and an open center section that traverses along the length of the cylinder. The end opening and open center section of the moveable cylinder 56 can accommodate a support 47, for example, a center post used to stack reactor components. The moveable cylinder can slide along the length of the center post 47 into the interior region of the reactor to contact a reactor component and push on a component to facilitate positioning of the component and/or cause movement or expansion of one or more reactor components. For example, the moveable cylinder 56 can push against an expansion weight 16 in a reactor to expand cones 19 that force one or more fans 20 to expand radially outward towards the inner wall of a reactor tube 42.

A guide tube 63 can be used to ensure the moveable cylinder moves in a straight path. The guide tube can be a cylinder having an open center section for receiving the moveable cylinder 56. The guide tube can be in direct contact with the moveable cylinder. FIG. 4 shows the guide tube 63 having a top end connected to the bottom of the pneumatic cylinder 52 and the bottom end connected to the top of the attachment assembly 45.

The moveable cylinder 56 can have one or more slots 56a that extend along a portion of the wall of the moveable cylinder. The slots 56a are wall openings that expose the internal open section of the moveable cylinder 56. The slots 56a can be rectangular openings and the moveable cylinder can have one or more slots, such as 1, 2, 3, 4, or 5 slots. The slots 56a are sized to accommodate the gripping jaws of the attachment assembly 45. The slots permit the moveable cylinder to move in and out of the reactor tube while the gripping jaws engage the support to secure the tool 40 to the reactor.

The moveable cylinder 56 can be actuated to slide up and down by compressed gas. As shown, the moveable cylinder is connected to a pneumatic cylinder 52 having a plunger 58 for moving the cylinder up and down. The plunder 58 is actuated up and down in the pneumatic cylinder 56 with compressed gas. The pneumatic cylinder can have one or more inlets for receiving compressed gas. For example, the pneumatic cylinder can have a top inlet 58a and a bottom or side inlet 58b, which can be secured to gas supply tube or lines with connectors or adaptors as known in the art. Each inlet can be supplied with compressed gas to move the plunger up and down to actuate the moveable cylinder 56. As shown in FIG. 4, compressed gas can be supplied to the pneumatic cylinder at the bottom or side inlet 58b through a supply tube 60. Although not shown, a separate supply tube can be used to supply compressed gas to the top inlet 58a. The compressed gas in the supply tubes can be generated from the upper manifold 70, for example, as shown in FIG. 7.

The tool 40 can further include a securing means 62 for raising and lowering the tool during reactor installation. As shown in FIG. 4, the securing means 62 can be a hook, such as a U-shaped bracket, mounted or connected to the tool 40. The hook can be secured to the top spacer ring 43, for example, with a set screw.

In another embodiment, the tools described herein can be used to install reactor components in various tubular reactors. The method of installing a reactor component can include providing a reactor installation tool 1, 40 having a releasable attachment assembly 5, 45 capable of securing the tool to a reactor or a support 4, 47 located in an interior region of the reactor or outside the reactor tube 2, 42. In the case the support 4, 47 is located outside the reactor tube 2, 42, such as in the case of a support having a stack of reactor components 20, 19, 16 ready for loading into a reactor tube, the reactor installation tool can be used to lower the support and reactor components into the reactor tube. Once the support and reactor components are in the reactor tube, and the tool is secured to the support 4, 47, the reactor installation tool 1, 40 can be used to position the components, e.g., 20.

Positioning the components can include the reactor installation tool having a means for pressurizing an interior region of the reactor containing the reactor components, such as with a gas supply outlet arranged within the seal opening. The means for pressurizing the interior region can include pressurized gas outlet in the tool that can deliver blasts of pressurized or compressed gas that can cause reactor components to move and/or expand into desired locations in the reactor tube. To deliver the compressed gas to pressurize an interior region of the reactor, the tool can have a compressed gas outlet having an outlet hole for each air tube that can run along the length of the tool to the end facing the open interior region of the reactor. Compressed gas can be released into the interior region of the reactor thereby pressurizing the interior region and causing reactor components to expand in the radial direction towards the reactor tube wall. The released compressed gas can further serve to push downward on expansion weights 16 and cones 19 that can further expand components 20 radially outward. The released compressed gas can be at a pressure of 10 to 100 psi, and the interior region of the reactor can be pressurized to a pressure of 1 to 70 psi. The compressed gas can come from an external source located outside tool, for example, supplied to the tool with the use of air lines or tubes connected to the tool or manifold 15, 70. Alternatively, the compressed gas can be supplied with an interior cartridge of gas, such as a $CO_2$ cartridge, located in the tool (not shown).

To ensure or help prevent compressed gas from escaping the interior region of the reactor, a seal 9 can be used. The seal can be secured to the tool and one end of the seal can be flexible 9b and extend into the reactor for engaging the reactor components and isolating the interior region from the atmosphere or area outside the reactor tube. Once the compressed gas is released into the interior region, either sealed with the seal or not, the reactor installation tool can be detached by releasing the releasable attachment assembly 5, 45 or gripping jaws 6, 46 contained therein so the support is no longer being gripped. Alternatively, the tool can remain secured to the support 4, 47. Either attached or unattached, the tool positioned on an opening of the reactor tube can engage and push on reactor components to further position them as desired, for example, pushing on an expansion weight to expand cones and fans.

The tool can be equipped with a moveable cylinder 14, 56 for engaging reactor components as described above with regard to FIGS. 1-6. The moveable cylinder 14, 56 can be actuated to extend outward from the tool to engage a reactor component. In an example, the moveable cylinder can slide over the support 4, 47 and down along its length to push on a reactor component, such as expansion weight 16, in the interior region of the reactor. The moveable cylinder can extend through the releasable attachment assembly 5, 45 and seal to enter the sealed interior region. The moveable cylinder can be actuated as described above with slidable push weights 21 or compressed gas, such as with a pneumatic cylinder 52. The moveable cylinder can be retracted and the tool can be removed from the reactor opening or detached from the support if still attached to the reactor with the releasable attachment assembly.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modification as encompassed by the scope of the appended claims.

What is claimed is:

1. A reactor installation tool comprising: a releasable attachment assembly for securing the reactor installation tool to a support inside a reactor; a gas supply outlet being open to the reactor, the gas supply outlet being capable of providing compressed gas to the interior region of the reactor; a seal for engaging the interior region of the reactor, and a movable cylinder for pushing on a reactor component positioned in an interior region of the reactor, wherein the releasable attachment assembly clamps onto the support inside the reactor.

2. The reactor installation tool of claim 1, the support in the reactor being a center post having reactor components positioned on the center post.

3. The reactor installation tool of claim 1, the releasable attachment assembly having at least two gripping jaws.

4. The reactor installation tool of claim 1, the movable cylinder having an opening for accommodating the support inside the reactor such that the moveable cylinder can slide along a length of the support to contact the reactor component.

5. The reactor installation tool of claim 1, the seal having a first end and a second end, the first end being releasably secured to the reactor tool and the second end being flexible for engaging the interior region of the reactor.

6. The reactor installation tool of claim 1, the gas supply outlet being air tubes arranged radially away from the movable cylinder.

7. The reactor installation tool of claim 1, the gas supply outlet comprising three air tube openings located near an end of the reactor tool that engages the reactor.

8. The reactor installation tool of claim 1, the movable cylinder being actuated by compressed gas.

9. The reactor installation tool of claim 1, the movable cylinder being connected to a pneumatic cylinder, the pneumatic cylinder being connected to a compressed gas supply for actuating the movable cylinder for engaging and pushing on the reactor component.

10. The reactor installation tool of claim 1, the movable cylinder being actuated by a releasable push weight positioned in the tool.

11. The reactor installation tool of claim 1, the movable cylinder being connected to a push weight, the push weight being releasable attached to a trip assembly.

12. A reactor installation tool comprising: a releasable attachment assembly for securing the tool to a center post inside a reactor; a means for releasing compressed gas to an interior region of the reactor, and a movable cylinder for pushing on a reactor component positioned in the interior region of the reactor, the movable cylinder being actuated by compressed gas or slidable weights and wherein the releasable attachment assembly clamps onto the center post.

13. The reactor installation tool of claim 12, the releasable attachment assembly having at least two gripping jaws.

14. The reactor installation tool of claim 12, the movable cylinder being capable of actuating in and out of the tool and into the interior region of the reactor for engaging the reactor component.

15. The reactor installation tool of claim 12, the movable cylinder having an opening for accommodating the center post inside the reactor.

16. The reactor installation tool of claim 15, the reactor component being positioned on the center post.

\* \* \* \* \*